(12) United States Patent
Borger et al.

(10) Patent No.: US 9,485,637 B2
(45) Date of Patent: Nov. 1, 2016

(54) INTERMEDIATED DATA ENTRY IN A SHARED MESSAGE BOARD THROUGH A MOBILE COMPUTING DEVICE

(71) Applicant: International Business Machines Corporation, Armonk, NY (US)

(72) Inventors: Sergio Borger, Sao Paulo (BR); Carlos H. Cardonha, Sao Paulo (BR); Fernando L. Koch, Florianopolis (BR)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 14/620,468

(22) Filed: Feb. 12, 2015

(65) Prior Publication Data

US 2016/0242013 A1    Aug. 18, 2016

(51) Int. Cl.
H04L 29/08    (2006.01)
H04W 4/14    (2009.01)
H04W 4/18    (2009.01)
H04M 1/725   (2006.01)
H04L 12/58   (2006.01)

(52) U.S. Cl.
CPC .............. *H04W 4/14* (2013.01); *H04L 51/066* (2013.01); *H04M 1/7255* (2013.01); *H04W 4/18* (2013.01)

(58) Field of Classification Search
CPC ..... H04W 4/14; H04W 4/18; H04M 1/7255; H04L 51/066
USPC ............................................... 455/414.4, 411
See application file for complete search history.

(56) References Cited

U.S. PATENT DOCUMENTS

| 6,757,365 | B1 * | 6/2004 | Bogard | H04L 51/04 379/88.17 |
|---|---|---|---|---|
| 7,146,181 | B2 | 12/2006 | Schaedler et al. | |
| 7,805,487 | B1 | 9/2010 | Isaacs et al. | |
| 2002/0167522 | A1 * | 11/2002 | Miyazawa | H04L 29/06 345/530 |
| 2004/0110495 | A1 * | 6/2004 | Yanagisawa | H04M 1/66 455/414.1 |
| 2004/0128673 | A1 * | 7/2004 | Fuchs | G06F 9/542 719/310 |
| 2004/0215721 | A1 * | 10/2004 | Szeto | H04L 12/58 709/204 |
| 2005/0086305 | A1 * | 4/2005 | Koch | G06Q 10/10 709/206 |
| 2005/0203673 | A1 | 9/2005 | El-Hajj et al. | |
| 2010/0081461 | A1 | 4/2010 | Bothra et al. | |
| 2010/0217837 | A1 | 8/2010 | Ansari et al. | |
| 2011/0201317 | A1 | 8/2011 | Karandikar et al. | |
| 2011/0313861 | A1 * | 12/2011 | Lawrence, III | G06Q 30/02 705/14.64 |
| 2011/0320547 | A1 | 12/2011 | Lefar et al. | |
| 2012/0191341 | A1 * | 7/2012 | Nara | G01C 21/36 701/420 |
| 2013/0101097 | A1 * | 4/2013 | Shaw | H04M 1/7255 379/88.14 |
| 2014/0282896 | A1 * | 9/2014 | Torgersrud | H04L 63/02 726/4 |
| 2016/0021038 | A1 * | 1/2016 | Woo | H04L 51/046 709/206 |
| 2016/0036734 | A1 * | 2/2016 | Ruth | A63F 13/35 709/206 |

FOREIGN PATENT DOCUMENTS

JP          2003304330  A  * 10/2003

OTHER PUBLICATIONS

"IVR Platforms, IVR Hosting, IVR Development", provided in Main Idea of Disclosure dated Sep. 26, 2012, <http://voxeo.com/>.

(Continued)

*Primary Examiner* — Charles Shedrick
(74) *Attorney, Agent, or Firm* — Fusheng Xu (57) ABSTRACT

A mobile device is employed to be a gateway device to transmit messages between end-users and a shared message board running on a remote sever. The gateway device runs a gateway application to implement the gateway function.

20 Claims, 4 Drawing Sheets

(56) References Cited

OTHER PUBLICATIONS

"Outspoken, MMS / SMS Aggregation, Messaging and APIs", Outspoken™, provided in Main Idea of Disclosure dated Sep. 26, 2012, <http://outspoken.com/>.

"Tropo—Cloud API for Voice and SMS", provided in Main Idea of Disclosure dated Sep. 26, 2012, <https://www.tropo.com/>.

"Twilio Cloud Communications—APIs for Voice, VoIP and Text Messaging", provided in Main Idea of Disclosure dated Sep. 26, 2012, <http://www.twilio.com/>.

* cited by examiner

INTERMEDIATED DATA ENTRY IN A SHARED MESSAGE BOARD THROUGH A MOBILE COMPUTING DEVICE

FIELD OF THE INVENTION

The present invention relates generally to the field of interactive communication, and more particularly to the intermediation of data entry in a shared message board.

BACKGROUND OF THE INVENTION

It is known to post content in a shared message board through forms in web applications. Such solutions restrict users to a set of people having access to a web application and having therefore direct access to the board.

As an alternative, one could suggest to employ a web-based SMS (short message service) gateway to enable the communication with a shared message board. Another alternative is to employ a mini-modem apparatus (e.g. USB modems) connected to computer devices and to use a computer application to implement the gateway application functionality.

SUMMARY

In one aspect of the present invention, a method, a computer program product, and a system includes: sending a first message in a first format from a user device to a gateway device having a phone number, the gateway mobile device running a gateway application, converting the first format to a second format, the second format being a suitable format to generate a converted message from the first message, and submitting the converted message to a shared message board (SMB). Converting the first message to the converted message is performed by the gateway application. The converted message is intermediated as a data entry by an SMB application on the SMB.

DETAILED DESCRIPTION

A mobile device is employed to be a gateway device to transmit messages between end-users and a shared message board running on a remote sever. The gateway device runs a gateway application to implement the gateway function. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
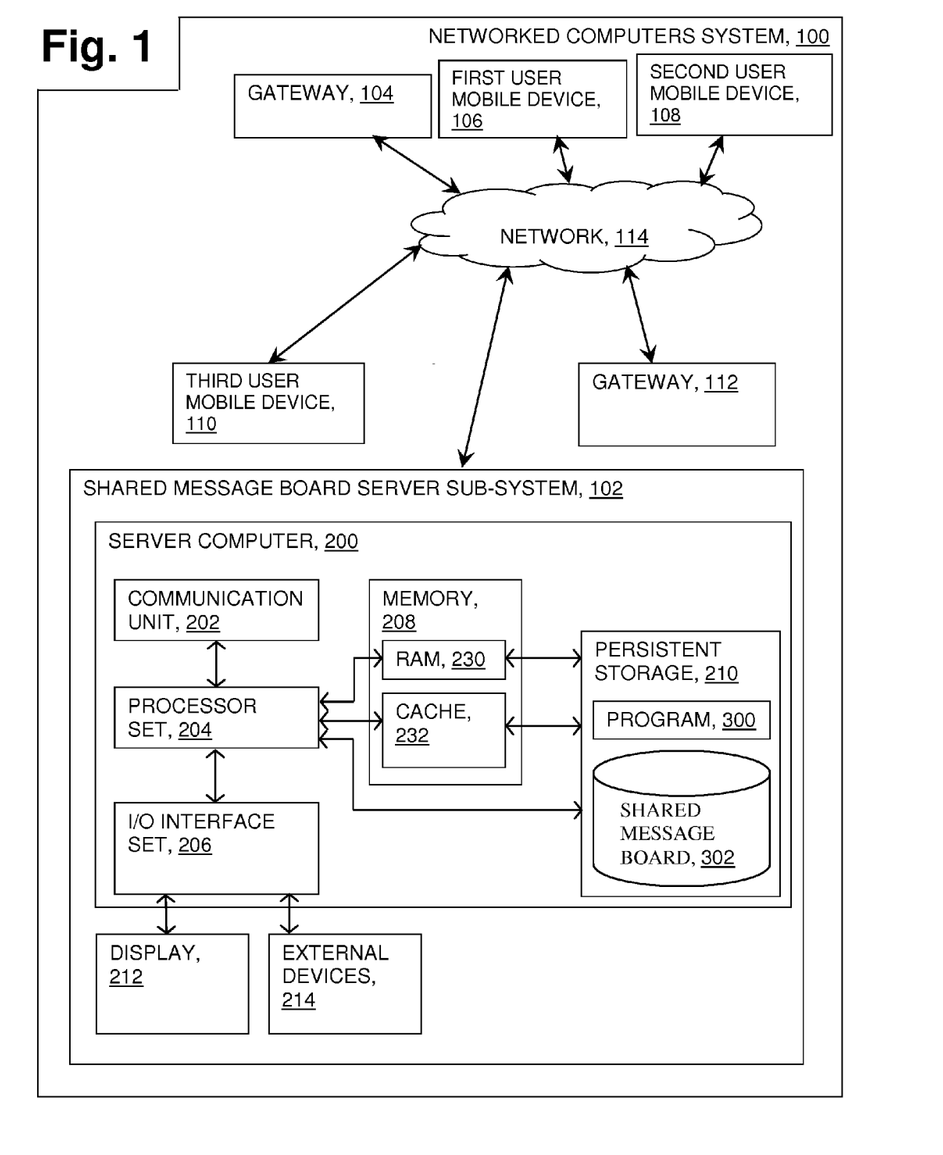
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: shared message board server sub-system 102; gateways 104, 112; first user mobile device 106; second user mobile device 108; third user mobile device 110; communication network 114; server computer 200; communication unit 202; processor set 204; input/output (I/O) interface set 206; memory device 208; persistent storage device 210; display device 212; external device set 214; random access memory (RAM) devices 230; cache memory device 232; shared message board 302; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 and shared message board 302 are stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Program 300, operates to collect, store, index, analyze, and/or transmit messages via a telecommunication (and/or IT) infrastructure, for example, network 114. Such messages are submitted by users using devices (e.g., first user mobile device 106, second user mobile device 108, third mobile device 110 in FIG. 1) to gateways (e.g., gateways 104, 112 in FIG. 1), and further are transmitted by the gateways to a shared message board running on a remote server (e.g., shared message board server 102 in FIG. 1). Further, program 300 generates notification on the shared message board, and send each of the notifications via the gateways to each of a group of end-users. Program 300 may include a shared message board's server application and a gateway application.

Some embodiments of the present invention recognize the following facts, potential problems and/or potential areas for improvement with respect to the current state of the art: (i) a user using forms in web application experiences to be not as seamless and barrier-free as desirable; (ii) employing a web-based SMS (short message service) gateway would be dependent on a third-part service, which is not as barrier-free and adaptable as desirable; (iii) employing a mini-modem apparatus is also not desirable due to: the level of technical complexity, requirement for a computer element for the operations, and/or the dependency on technical specifications and limitations of the applied mini-modem device; (iv) a device working as a gateway is required to be able to receive and convert messages from different formats; (v) a gateway leading with SMS needs to carry relevant information that should be displayed and/or made public; (vi) an interactive communication system should be as seamless and barrier-free as desirable for a user; and/or (vii) a solution that allows for easy transmission of complex messages (i.e., composed of text, media, and geo-location information) in an integrated way is desirable.

Some embodiments of the present invention provide a system and a method for receiving messages and submitting the messages to an engine responsible for the management of an online shared message board, where the gateway function is performed by an application deployed on a mobile device. The messages include short messages (e.g., using SMS), multimedia messages (e.g., using multimedia message service (MMS)), and/or transcribed voice messages.

Some embodiments of the present invention further provide a notification mechanism where the shared message board can communicate back to end-users by creating a list of notifications. The list of notifications are interpreted by the gateway application to generate short messages (e.g., using SMS), multimedia messages (e.g., using MMS), and/or transcribed voice messages that are delivered to end-users' mobile computing devices Some embodiments of the present invention enable a bi-lateral interaction between end-users and a shared message board via mobile computing apparatus (i.e., end-user device) using short message service, multimedia message service, and/or transcribed voice message whereas there is a bi-lateral communication gateway implemented as a mobile computing application (i.e., gateway application) running on another mobile computing apparatus (i.e., gateway device), which transpose incoming communication messages to back-end services. The back-end services run on a remote server that provides the infrastructure for the shared message board.

Alternatively, the gateway application may run on remote server 102, and is included in program 300.

Figure 2:
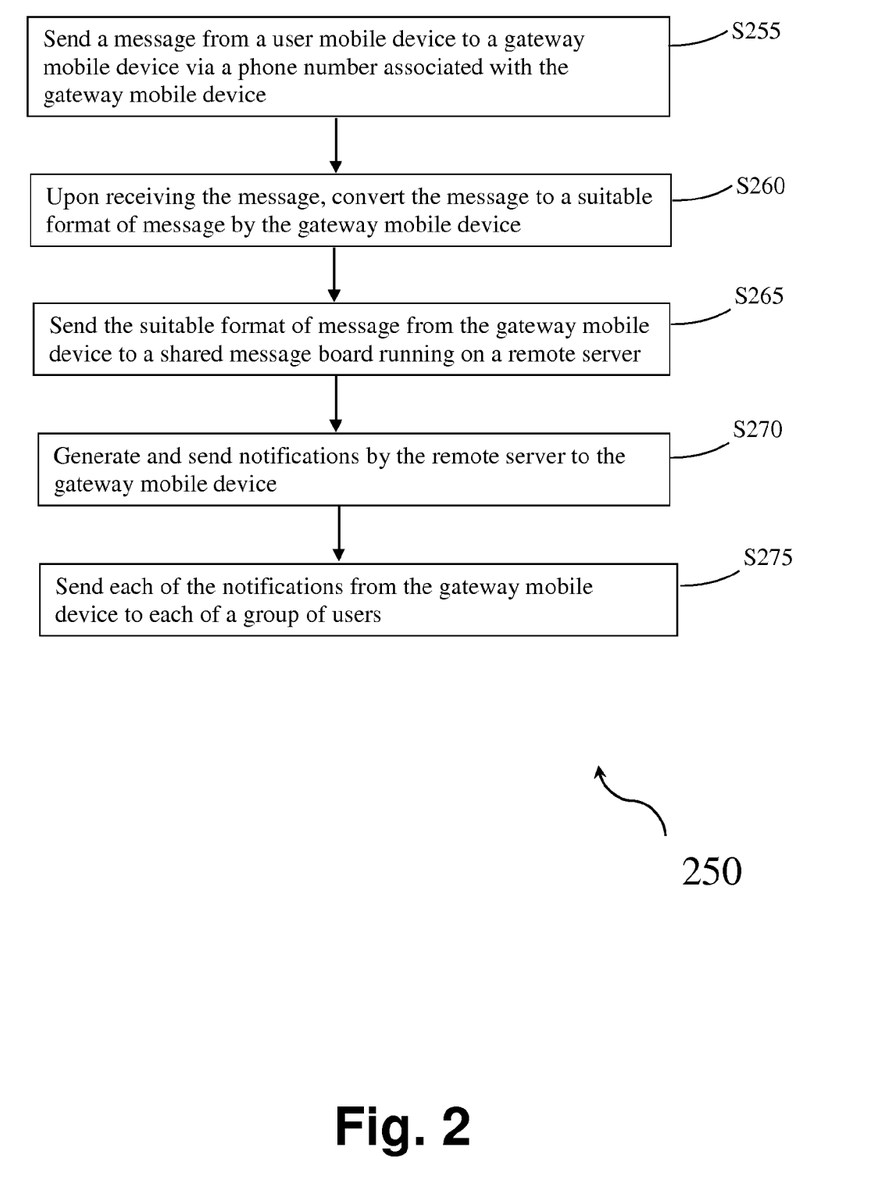
FIG. 2 is a flowchart showing a method performed, at least in part, by the first embodiment system.
Figure 3:
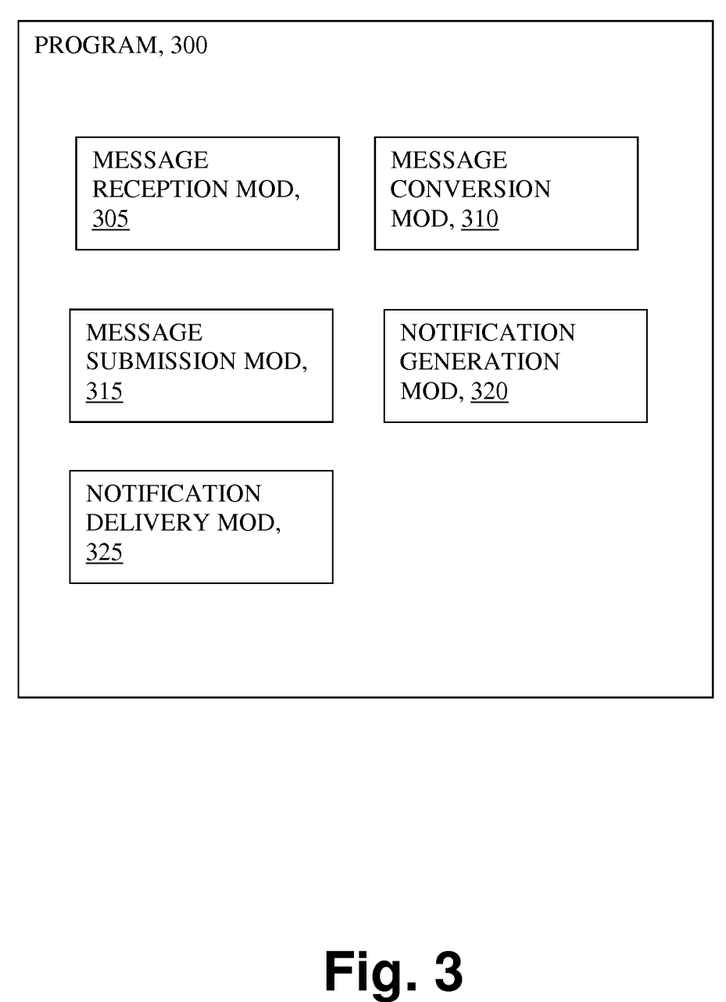
FIG. 3 is a schematic view of a machine logic (for example, software) portion of the first embodiment system for performing the method shown in FIG. 2.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where a user sends a message from a user mobile device (e.g., first user mobile device 106) to a gateway mobile device via a phone number associated with the gateway mobile device (e.g., gateway 104). The message may be a short text message or a multimedia message including text, voice, and/or image. Both the user mobile device and the gateway mobile device include an iPhone, an Android phone, or any other type of smartphone. In addition, the user mobile device may be an entry-level device that is able to send and receive calls and text messages. Further, the gateway device may be any device that is able to execute the gateway application. (Note: the term(s) "iPhone" and/or "Android" may be subject to trademark rights in various jurisdictions throughout the world and are used here only in reference to the products or services properly denominated by the marks to the extent that such trademark rights may exist.) In this exemplary embodiment, the user enters a text message into the user mobile device. Applications of the operating system on the user mobile device transmit the text message to the gateway mobile device having a phone number through a public telecommunication and/or a shared IT infrastructure, for example, network 114, including 3G, 4G, LAN, WAN, or WIFI transmission using http protocol. The public telecommunication infrastructure includes towers and communication systems running by a telecommunication operator. The IT infrastructure may include a cloud service system.

The message may be encoded, for example, using UTF-8 (universal character set, transformation format, 8-bit). In this scenario, MMS content may be received and transmitted as text documents if the MMS is transmitted as text from the user mobile device to the gateway mobile device, for example, standard Java and Python libraries offer this functionality. (Note: the term(s) "Java" and/or "Python" may be subject to trademark rights in various jurisdictions throughout the world and are used here only in reference to the products or services properly denominated by the marks to the extent that such trademark rights may exist.)

Further, in this step, through message reception module 305 the gateway mobile device receives the message sent from the user mobile device. The gateway mobile device performs the gateway function by implementing a gateway application contained in the message reception module 305. Alternatively, the gateway application runs on the gateway mobile device. The gateway application includes a message interface through which the gateway mobile device reads the message sent by the user mobile device.

In some embodiments of the present invention, the gateway application is a smartphone software. The gateway application is deployed on a mobile device equipped with a SIM (subscriber identity/identification module) card to receive and/or send SMS/MMS messages.

Processing proceeds to step S260, where, upon receiving the message by the gateway mobile device, message conversion module 310 converts the message to a suitable format of message for processing, resulting in a converted message. In some embodiments, a message may be encoded in a different format when transmitted from the user mobile device to the gateway on the gateway mobile device, and vice-versa. The format conversion is automatically performed by calling functions from a system that can be used by the gateway.

Process proceeds to step S265, where message submission module 315 sends_the converted suitable format of a message from the gateway mobile device to a shared message board running on a remote server. In this exemplary embodiment, the gateway application included in message submission module 315 transfers the converted message in a suitable format to the remote server engine using transmission via shared IT infrastructure and/or public telecommunication, for example, network 114 including 3G, 4G, LAN, WAN or WIFI transmission using http protocol. The public telecommunication infrastructure includes towers and communication systems running by a telecommunication operator. The IT infrastructure may include a cloud service system.

The gateway application transfers the converted message through a communication interface of the gateway application. The converted message is received by a shared message board's server application through a communication interface of the shared message board's server application running on a remote server (e.g., server 102.) The properly formatted message is ingested in a data repository as data entry of shared message board 302, and is intermediated and displayed on the shared message board.

In some embodiments, the communication interface in both the gateway application and the shared message board's application employ (hypertext transfer protocol) HTTP and/or HTTPS (hypertext transfer protocol secure) protocol, and uses either an authenticated or non-authenticated connection.

In some embodiments, an application running on the gateway mobile device provides an interface to manage the contents in the shared message board, such as sending commands to edit/delete/configure elements in the shared message board, through a communication interface of the message board's server application running on the remote server.

Some embodiments of the present invention further provide a method and/or a system for the shared message board to communicate back to end-users via a short message service, a multimedia service, a transcribed voice service, or others. For this scenario, the following example is provided: a shared message board for job matching that is composed of a first column for job opportunities and a second column for available professionals.

In this exemplary embodiment, process proceeds to step S270, where notification generation module 320 generates notifications on the remote server. The notifications are transmitted by the remote server back to the gateway mobile device. Alternatively, the notifications are transmitted by the remote server back to another gateway mobile device (e.g., gateway 112 in FIG. 1). The transmission of notification is through a shared IT infrastructure and/or public telecommunication, for example, network 114 including 3G, 4G, LAN, WAN, or WIFI transmission using http protocol. The public telecommunication infrastructure includes towers and communication systems running by a telecommunication operator. The IT infrastructure may include a cloud service system.

Specifically, a software application module (e.g., notification generation module 320) running on the remote server cross-relates data entries in the first and second columns directly in the data repositories, searching for matching of some sort. When there is a matching between the first column of job opportunity versus the second column of available professionals, this software module application generates notification lines that report a destination phone number to which a message is sent, for example, one line for the available professional and another line for the employee offering the matched job opportunity. A set of notification lines form a notification list that is accessible through an interface (e.g., notification generation module 320) of the remote server, in such a way that the shared message board acts as an intermediation platform of data entry, including notification lines.

In some embodiments of the present invention, the notification lines are generated by any process other than notification generation module 320 in the remote server. The any process is associated to processing of data repositories or other origin.

Further, on the gateway device (e.g., gateway mobile device 104), a gateway application runs an algorithm to periodically request the notification list. Upon fetching the list of notifications, the gateway application iterates the notifications. For each notification line in the notification list, this algorithm composes a short-message notification to be sent to the destination phone number (i.e., end-users), for example, first user mobile device 106, second user mobile device 108, and third user mobile device 110 in FIG. 1.

Process now ends at step S275, where notification delivery module 325 in this exemplary embodiment, sends each of the notifications by the gateway mobile device to each of a group of end users. The group of end users may include first user mobile device 106, second user mobile device 108, and third user mobile device 110 in FIG. 1. The notification includes a destination phone number to which each user is associated, and may be a short message, a multimedia message, a transcribed voice message, a voice message, a video, and/or an image.

The transmission of notification back to end-users is through a shared IT infrastructure and/or public telecommunication, for example, network 114 including 3G, 4G, LAN, WAN, or WIFI transmission using http protocol. The public telecommunication infrastructure includes towers and communication systems running by a telecommunication operator. The IT infrastructure may include a cloud service system. This functionality allows for creating a communication channel so that shared message board applications (e.g., program 300) can notify back to end-users, extending the reach and functionality of the shared message board system.

Some embodiments of the present invention may include one, or more, of the following features, characteristics, and/or advantages: (i) add great value to shared message board solutions providing a fully integrated gateway solution that simplifies technical operations, reduces deployment costs, and implements an all-in-one solution for short messages, multimedia messages, and/or transcribed voice messages interface to a shared message board; (ii) can be easily implemented; (iii) is less expensive to be maintained; (iv) provides a seamless experience to users as the users do not need to have access to a web service to post content (e.g., interact) with the shared message board and are able to submit content whenever their mobile devices have access to the shared telecommunication infrastructure; (v) have easy and inexpensive scalability(e.g., to add another shared message board, only a mobile device able to run a gateway application is required); and/or (vi) is independent from third-part partners(e.g., transmission of data from the gateway to the server engine may use a shared IT infrastructure, which is currently less expensive, affordable, and does not require complex deals with partners).

Figure 4:
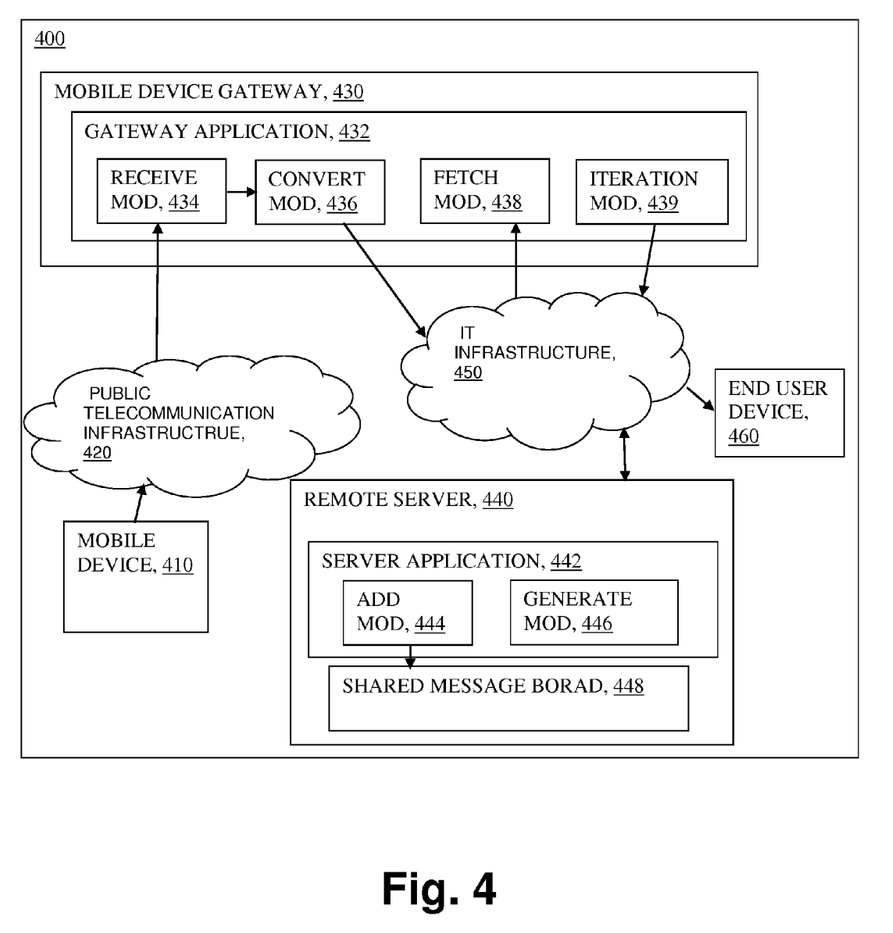
FIG. 4 is a schematic view of a second embodiment system according to the present invention.

FIG. 4 is a block diagram of message processing system 400 for practicing a method according to an embodiment of the present invention. System 400 includes: mobile device 410; public telecommunication infrastructure 420; mobile device gateway 430; gateway application 432; receive module 434; convert module 436; fetch module 438; iteration module 439; remote server 440; server application 442; add module 444; generate module 446; shared message board 448; IT infrastructure 450; and end user device 460.

According to a process practiced by system 400, processing begins where a user types in mobile device 410 a text message (referred to as S). The operating system's applications in mobile device 410 transmit S through public telecommunication infrastructure 420, resulting in S being received by the phone number associated to mobile device gateway 430, through receive module 434, that runs on gateway application 432. In this example, mobile device 410 includes a portable device able to send and receive text and image messages. Message S may include text, voice, and/or multimedia. Mobile device gateway 430 may be any type of smartphone.

Processing proceeds where convert module 436, running on gateway application 432 on mobile device gateway 430, converts message S into a format that is usable for processing, resulting in a converted message (referred to as S').

Processing proceeds where gateway application 432, running on mobile device gateway 430, submits the converted message S' to shared message board's server application 442, that runs on remote server 440, through IT infrastructure 450. Add module 444, on server application 442, adds message S' to shared message board 448, such that message S' is registered in the shared message board's data repository and is displayed on shared message board 448.

Further, processing proceeds where generate module 446, running on server application 442, generates notifications (referred to as N). Notifications N are sent to mobile device gateway 430 through IT infrastructure 450.

Processing proceeds where fetch module 438, running on gateway application 432, reads notifications N. Iteration module 439, on gateway application 432, iterates through each notification (referred to as n) in N to convert notification n to a message (referred to as S"). Message S" includes a short message and/or a multimedia message that is sent through IT infrastructure 450 to end user device 460 having a phone number associated to notification n. Alternatively, mobile device 410 and end user device 460 are the same device, i.e., the user uses the same device to send and receive messages.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
sending a first message in a first format from a user device to a gateway device having a phone number, the gateway mobile device running a gateway application;
converting the first format to a second format, the second format being a suitable format to generate a converted message from the first message; and
submitting the converted message to a shared message board (SMB),
wherein:
converting the first message to the converted message is performed by the gateway application; and
the converted message is intermediated as a data entry by an SMB application on the SMB.

2. The method of claim 1, wherein the gateway device includes a smartphone.

3. The method of claim 1, wherein the user device includes a smartphone or an entry-level mobile device that is able to send and receive messages.

4. The method of claim 1, wherein the message and the converted message are transmitted through a public telecommunication and/or a shared IT infrastructure including 3G, 4G, LAN, WAN, or WIFI.

5. The method of claim 4, wherein the transmission is performed: (i) using a HTTP protocol and/or a HTTPS protocol, and (ii) using an authenticated connection or non-authenticated connection.

6. The method of claim 1, wherein the message includes a short message service (SMS), a multimedia message service (MMS), a transcribed voice message, a voice message, a video, and/or an image.

7. The method of claim 1, wherein the gateway application provides an interface to manage the data entry in the SMB, the interface sending a command related to elements in the SMB through a communication interface of the SMB application.

8. The method of claim 7, wherein the command is one of edit, delete, and configure.

9. The method of claim 1, further comprising:
the SMB application generating a list of notifications to be transmitted to the gateway device; and
the gateway device transmitting the list of notifications to a plurality of users.

10. The method of claim 9, wherein the notification includes a short message service (SMS), a multimedia message service (MMS), a transcribed voice message, a voice message, a video, and/or an image.

11. The method of claim 9, wherein the list of notifications are transmitted through a public telecommunication and/or a shared IT infrastructure including 3G, 4G, LAN, WAN, or WIFI.

12. The method of claim 11, wherein the transmission is performed: (i) using a HTTP protocol and/or a HTTPS protocol, and (ii) using an authenticated connection or non-authenticated connection.

13. A computer program product comprising a computer readable storage medium having stored thereon:
first program instructions programmed to sending a first message in a first format from a user device to a gateway device having a phone number, the gateway mobile device running a gateway application;
second program instructions programmed to converting the first format to a second format, the second format being a suitable format to generate a converted message from the first message; and
third program instructions programmed to submitting the converted message to a shared message board (SMB);
wherein:
converting the first message to the converted message is performed by the gateway application; and
the converted message is intermediated as a data entry by an SMB application on the SMB.

14. The computer program product of claim 13, wherein the first message includes a short message service (SMS), a multimedia message service (MMS), a transcribed voice message, a voice message, a video, and/or an image.

15. The computer program product of claim 13, wherein the gateway application provides an interface to manage the data entry in the SMB, the interface sending a command related to elements in the SMB through a communication interface of the SMB application.

16. The computer program product of claim 13, further comprising:
fourth program instructions programmed to generate, by the SMB application, a list of notifications to be transmitted to the gateway device; and
fifth program instructions programmed to transmit, by the gateway device, the list of notifications to a plurality of users.

17. A computer system comprising:
a processor(s) set; and
a computer readable storage medium;
wherein:
the processor set is structured, located, connected, and/or programmed to run program instructions stored on the computer readable storage medium; and
the program instructions include:
first program instructions programmed to sending a first message in a first format from a user device to a gateway device having a phone number, the gateway mobile device running a gateway application;
second program instructions programmed to converting the first format to a second format, the second format being a suitable format to generate a converted message from the first message; and
third program instructions programmed to submitting the converted message to a shared message board (SMB)
wherein:
converting the first message to the converted message is performed by the gateway application; and
the converted message is intermediated as a data entry by an SMB application on the SMB.

18. The computer system of claim 17, wherein the first message includes a short message service (SMS), a multimedia message service (MMS), a transcribed voice message, a voice message, a video, and/or an image.

19. The computer system of claim 17, wherein the gateway application provides an interface to manage the data entry in the SMB, the interface sending a command related to elements in the SMB through a communication interface of the SMB application.

20. The computer system of claim 17, further comprising:
fourth program instructions programmed to generate, by the SMB application, a list of notifications to be transmitted to the gateway device; and
fifth program instructions programmed to transmit, by the gateway device, the list of notifications to a plurality of users.

* * * * *